United States Patent [19]

Lippa

[11] Patent Number: 4,892,608

[45] Date of Patent: Jan. 9, 1990

[54] AUTOMATIC TRANSVERSE SPLICING DEVICE FOR UNCURED ELASTOMERIC SHEET MATERIAL

[75] Inventor: Roberto Lippa, Castel Romano, Italy

[73] Assignee: Bridgestone/Firestone, Inc., Akron, Ohio

[21] Appl. No.: 299,589

[22] Filed: Jan. 23, 1989

[30] Foreign Application Priority Data

Jan. 22, 1988 [IT] Italy ................................. 67039 A/88

[51] Int. Cl.$^4$ ........................ B29D 30/06; B65H 69/06
[52] U.S. Cl. ..................................... 156/421; 100/237; 156/502; 156/580; 156/581; 156/583.91
[58] Field of Search ................... 156/157, 304.1, 304.5, 156/421, 502, 580, 581, 583.3, 583.91, 413, 130.3; 100/211, 237

[56] References Cited

U.S. PATENT DOCUMENTS 2,955,640 10/1960 Barns ................................. 156/502
4,722,132 2/1988 Ciolkevich ......................... 156/421
4,808,257 2/1989 Rex et al. ............................ 156/421

Primary Examiner—Michael Wityshyn
Attorney, Agent, or Firm—Ernst H. Ruf

[57] ABSTRACT

An automatic splicing device (7) for splicing the opposed transverse edges (4, 5) of strip elements (2, 3) of uncured elastomeric sheet material, particularly used in the assembly of pneumatic tires, the splicing device (7) including a roller (51) designed to move, via an actuating device, along the splice (6) being formed, and in contact with the rear edges of a number of blades (62) grouped together into a pack (61) but axially displaceable in relation to one another; the blades (62) being arranged perpendicular to, and equally-spaced along, the splice (6), with their respective front edges (67) contacting the elastomeric sheet material for splicing, and being thrust successively thereagainst by the moveable roller (51).

7 Claims, 4 Drawing Sheets

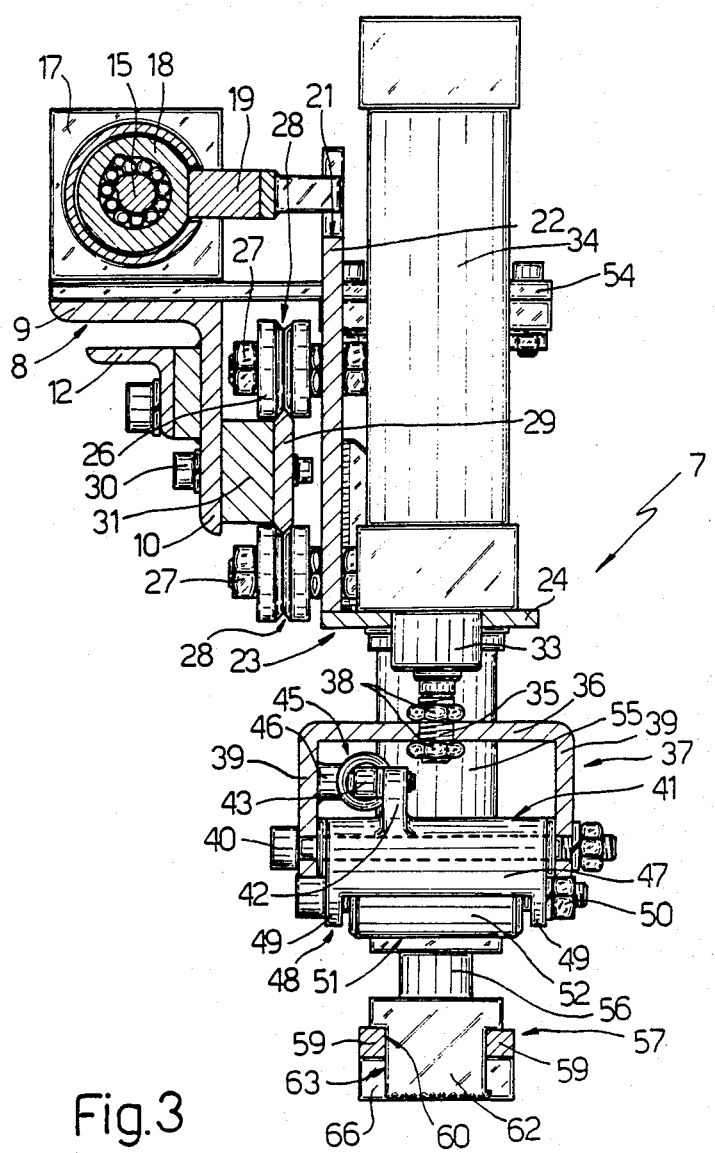
Fig.3
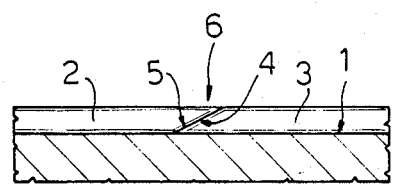

AUTOMATIC TRANSVERSE SPLICING DEVICE FOR UNCURED ELASTOMERIC SHEET MATERIAL

TECHNICAL FIELD

The present invention relates to an automatic transverse splicing device for green or uncured elastomeric sheet material. The device according to the present invention may be used to advantage for transversely splicing strips of elastomeric sheet material, particularly relatively thick strips used in the manufacture of pneumatic tires.

BACKGROUND OF THE ART

For splicing two strip portions of green elastomeric sheet material, or the opposite ends of a single strip portion for forming a ring or endless belt, the standard practice consists in forming opposed conjugate bevels along the two splice edges, which are then brought together and compressed mechanically.

DISCLOSURE OF THE INVENTION

The aim of the present invention is to provide a device enabling straightforward, low-cost, automatic splicing of the two beveled edges, and such mechanical compression as to ensure optimum interlocking of the two edges with no need for adhesives or other additional material. With this aim in view, according to the present invention, there is provided an automatic device for splicing green elastomeric sheet material along a predetermined transverse splicing line, the device being designed to cooperate with a surface supporting the material, and being characterized by the fact that it comprises a number of blades arranged substantially perpendicular to, and facing the supporting surface and the splicing line, and grouped together, in an axially-sliding manner to and from the supporting surface, into a displaceable pack of blades extending along the splicing line and having a first lateral surface facing the supporting surface; approach means for enabling relative displacement of the pack and the supporting surface to and from an operative position wherein the material for splicing is retained or confined between the pack and the supporting surface; and pressure means cooperating, in use, with a second surface of the pack, opposite the first surface, for axially thrusting the blades towards the supporting surface by successively applying a predetermined axial pressure on the blades.

The noted pressure means preferably concludes a splicing roller arranged facing the second surface; guide means extending parallel with the splicing line; slide means supporting the splicing roller and designed to travel along the guide means; first actuating means located between the slide means and the splicing roller, for moving the splicing roller to and from an operative position contacting, with predetermined pressure, the second surface of the pack; and second actuating means for moving the slide means in a reciprocating manner along the guide means, and so causing the splicing roller, in the operative position, to successively displace the blades toward the supporting surface.

A non-limiting embodiment of the present invention will now be described by way of example with reference to the accompanying drawings.

BRIEF DESCRIPTION OF THE DRAWINGS

FIG. 3 shows a section along line III—III in FIG. 1;

Figure 1:
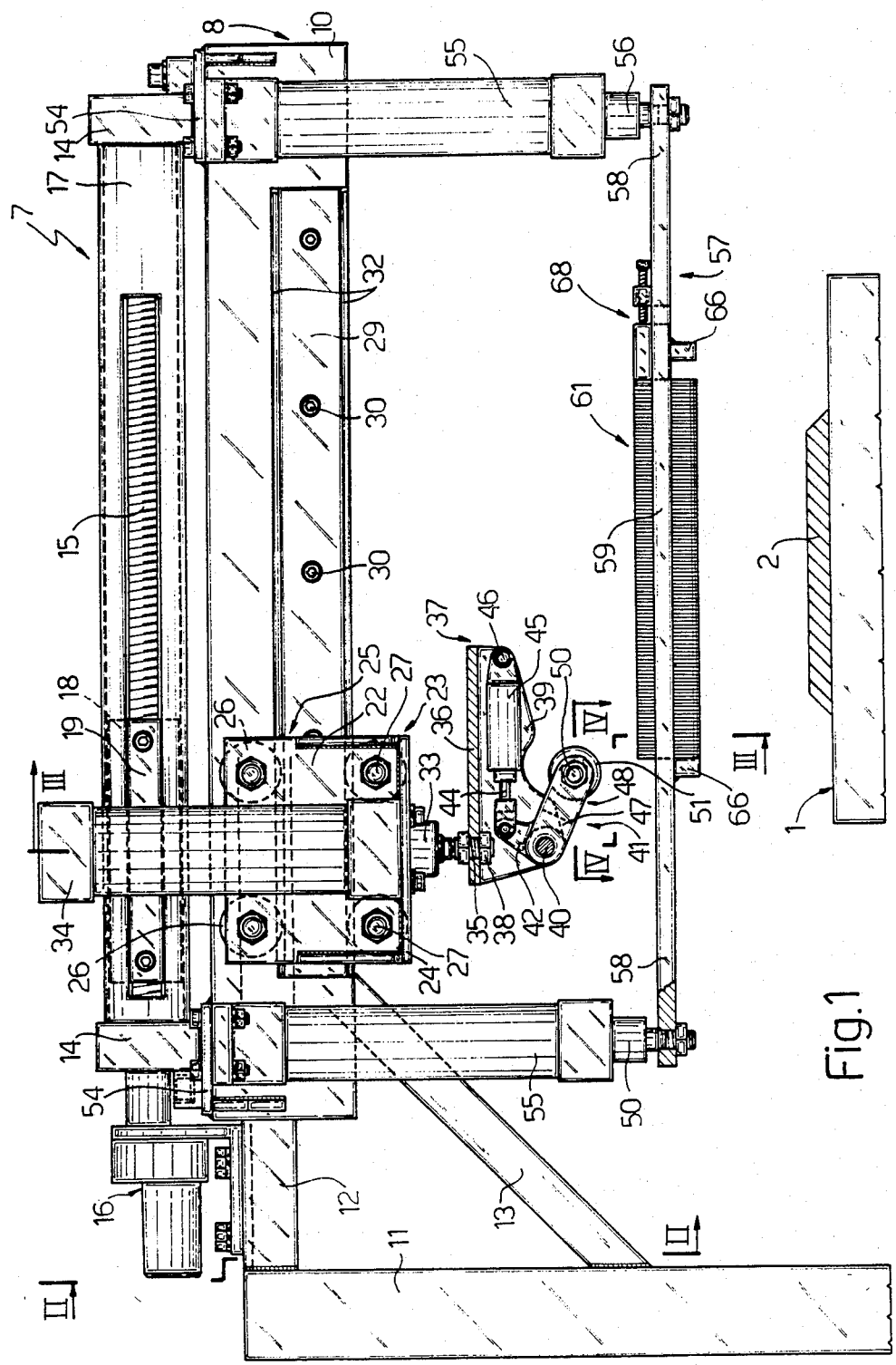
FIG. 1 shows a side view of one embodiment of the splicing device according to the present invention.
Figure 2:
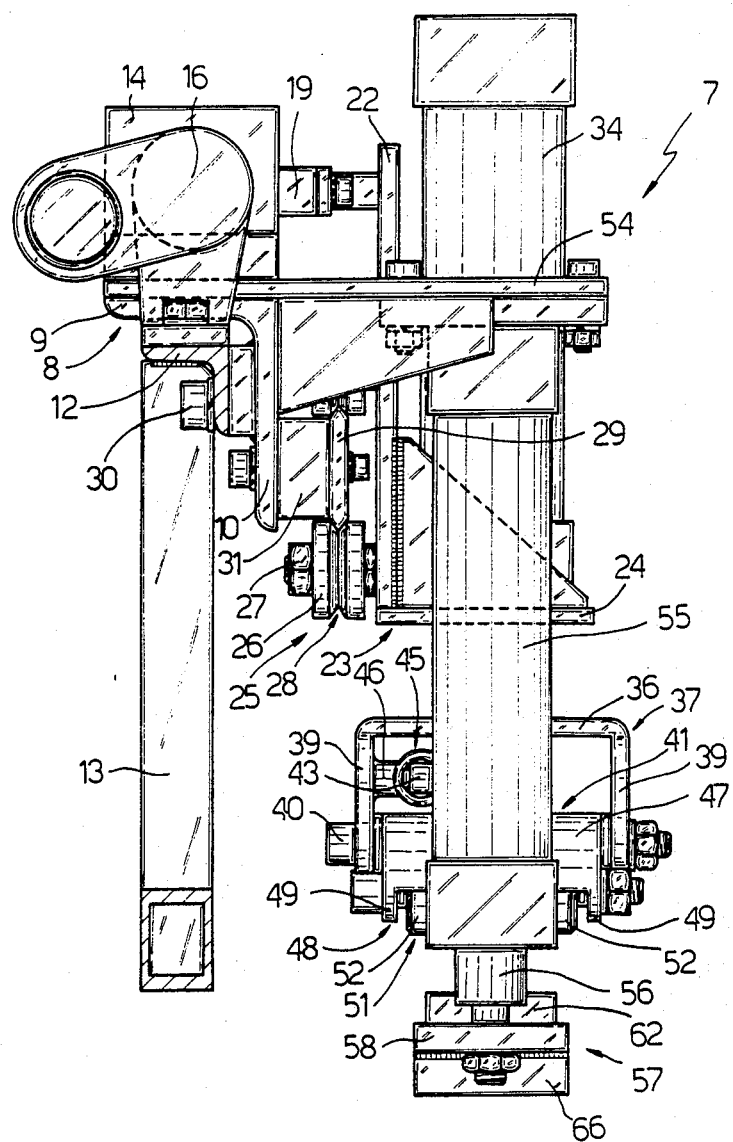
FIG. 2 shows a section along line II—II in FIG. 1.
Figure 2:
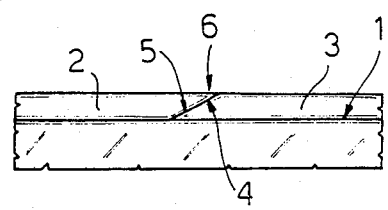

Number 1 in FIGS. 2 and 3 indicates a supporting surface for strips 2 and 3 of an uncured elastomeric material, substantially aligned perpendicular to the FIG. 1 plane. Strips 2 and 3 present respective opposed transverse strip edges defined by respective conjugate beveled surfaces 4 and 5 contacting along a transverse splicing line 6.

Substantially above surface 1, there is provided an automatic transverse splicing device 7 comprising a crosspiece 8 having a substantially L-shaped section and extending in parallel with line 6. Crosspiece 8 consists of a horizontal plate 9 and a front vertical core or portion 10, and is supported in a projecting manner, in the FIG. 1 position, by an end pillar 11 connected to core 10 by a horizontal bar 12 (FIGS. 2 and 3) integral with the top of pillar 11 and connected thereto by a diagonal brace 13 extending between bar 12, together with crosspiece 8, and the mid point of pillar 11. On top of each of its axial ends, plate 9 includes a support 14 connected in a rotary manner to a respective end of a screw 15, turned by a gear motor 16, the latter being supported on a bracket 12 and housed inside a casing 17 extending between supports 14.

As shown, particularly in FIG. 1, screw 15 is connected to a nut screw 18 having a horizontal axial appendix 19, extending out of casing 17 through an axial slot 20, in which appendix 19 can reciprocate in a sliding manner. The outer or free end of appendix 19 includes a pin which is engaged, in a sliding manner, in a vertical slot 21 (FIG. 3) formed on the top end of a vertical plate 22 parallel with core 10. Plate 22 constitutes a first arm of an L-shaped bracket 23, the second arm of which is formed by a plate 24, extending parallel with plate 9, from the bottom end of plate 22. Bracket 23 forms part of a slide or carriage 25 also including two pairs of rollers 26, each mounted for rotation on a bolt 27 fitted through plate 22. Each roller 26 includes an intermediate annular groove 28, and the rollers in each pair of rollers 26 are arranged on opposite sides of a blade 29, lying in a plane parallel with plate 22, extending substantially over the entire length of core 10 to which blade 29 is integrally connected via bolts 30 and via the interposition of spacers 31 (FIGS. 2 and 3). Blade 29 presents opposite tapered side edges 32 (FIG. 1) engaging grooves 28 of rollers 26 and forms a fixed slideway for carriage 25.

As shown, particularly in FIG. 1, through a hole formed in plate 24, there extends, in a sliding manner, a vertical rod 33 constituting the output member of a jack or actuator 34 arranged vertically over and integral with plate 24. From the free or bottom end of rod 33, there extends axially downwardly a threaded portion or appendix 35 which engages fork 37, through a hole in fork center plate 36, and is fastened thereto by two nuts 38.

Figure 4:
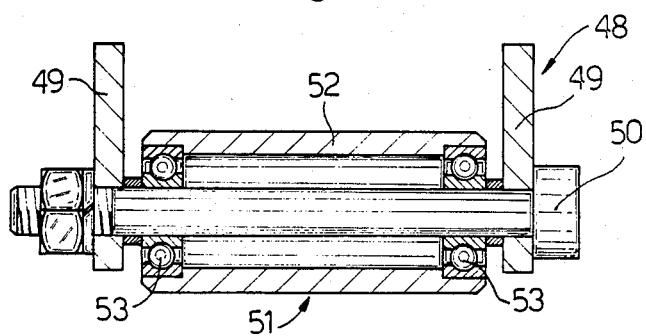
FIG. 4 shows a section along line IV—IV in FIG. 1.

As shown, particularly in FIG. 1, fork 37 includes two lateral arms 39 fitted with a through bolt 40, perpendicular to arms 39 and to the FIG. 1 plane. A center portion of bolt 40, extending between arms 39, supports, in rotary manner, a rocker arm 41 designed to turn about the axis of bolt 40 in a plane parallel with the FIG. 1 plane. Rocker arm 41 includes an upper arm 42 hinged, via a pin 43 parallel with bolt 40, to the free end of an output rod 44 of a damper or actuator 45 supported in rotary manner by one of arms 39 via pin 46 parallel with pin 43. Rocker arm 41 also includes a lower arm 47, the free end of which consists of a fork 48 having two arms 49 fitted with a through bolt 50; the center portion of bolt 50 supporting, as best shown in FIG. 4, a splicing roller 51 having a cylindrical jacket 52 integral with the outer race of two bearings 53, the inner races of which are fitted onto bolt 50.

As shown, particularly in FIGS. 1 and 2, between each support 14 and plate 9, there is interposed a plate 54 projecting from the same side of crosspiece 8 as is carriage 25. Each plate 54 is connected to the top end of a respective jack 55 or actuator 55 having a downward-facing output rod 56. As shown in FIG. 1, the two rods 56 include threaded free ends to which are secured the opposite ends of a frame 57 extending over surface 1 and parallel with splicing line 6. Frame 57 includes two coplanar, aligned, flat, rectangular plates 58, the opposite ends of which are connected to rods 56, and the opposed ends of which are connected together by two parallel rods 59. Rods 59 serve to define a slot 60 which is engaged by a pack 61 of blades 62 lying in substantially vertical planes and perpendicular to both surface 1 and splicing line 6.

Figure 5:
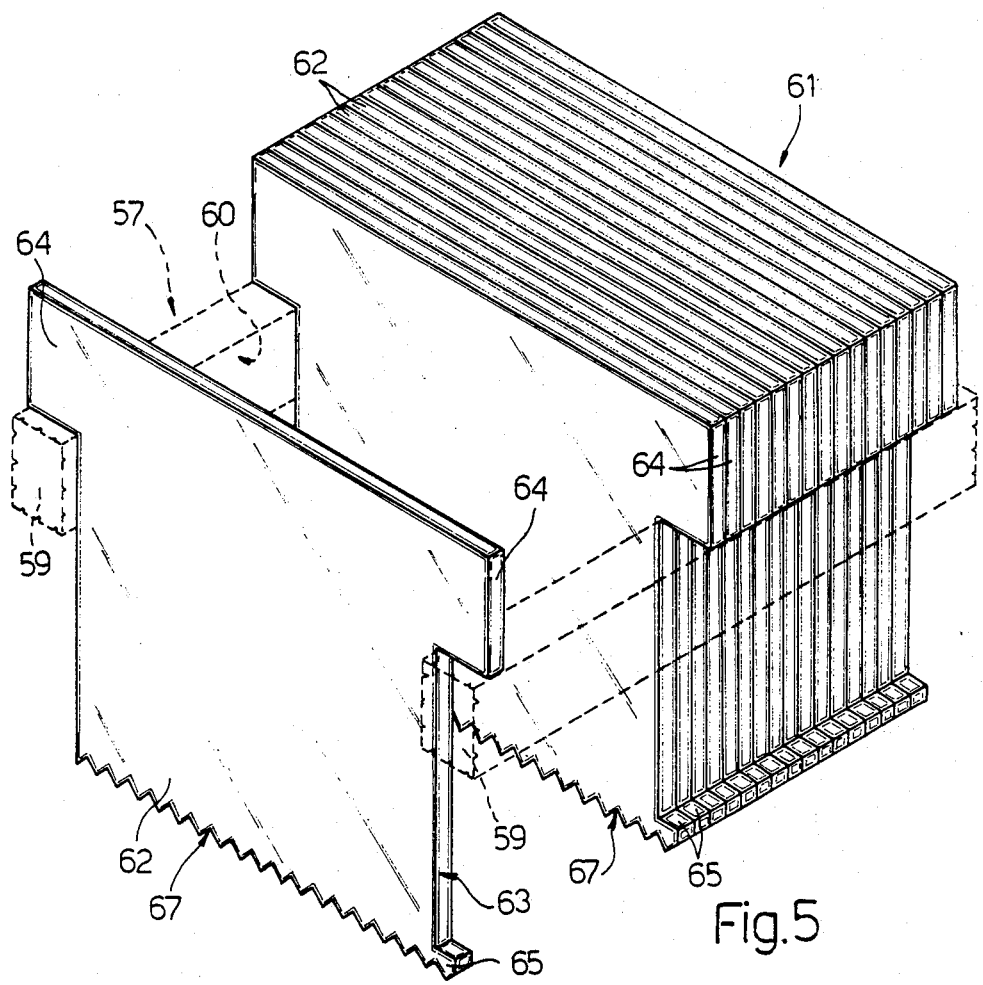
FIG. 5 shows a larger-scale, partially-exploded view, in perspective, of a detail in FIG. 1.

As shown in FIG. 5, each blade 62 is substantially rectangular in shape, and includes an intermediate portion having, along each vertical side edge, a recess 63 engaged by a respective rod 59 and defining, on one side, two projecting wings 64 and 65 extending outwardly from the respective top and bottom ends of blade 62, and, on the other side, a top wing 64 only. The width of the said intermediate blade portion, presenting recesses 63 on each blade 62, is at most equal to the width of slot 60, whereas the height of recesses 63 is greater than the thickness of rods 59, so as to enable relatively ample vertical displacement (equal to the difference between the height of recesses 63 and the thickness of rods 59) of blades 62 in relation to frame 57.

With reference to FIG. 1, at each end of slot 60, frame 57 includes a supporting foot 66, the bottom end of which is substantially flush with the respective serrated bottom edges 67 of blades 62, when blades 62 are arranged with their respective wings 64 resting on rods 59. At one end of slot 60, frame 57 also includes a gripping or locating device 68 designed to consolidate blades 62 into a pack 61, while at the same time allowing the said blades 62 to slide vertically in relation to both one another and frame 57. For assisting the mutual vertical displacement or sliding of blades 62, each pair of adjacent blades 62 includes a first blade preferably formed of metal, and a second blade formed of a material, e.g. plastic, having a low coefficient of friction.

In actual use, for splicing strips 2 and 3 along surfaces 4 and 5, the two strips are placed, with surfaces 4 and 5 contacting each other, beneath blade pack 61 in the FIG. 1 position. Actuators 55 are then activated so as to lower frame 57 in the direction of surface 1, with set feet 66 contacting surface 1 on opposite sides of splicing line 6. With frame 57 so positioned, the respective serrated edges 67 of blades 62 contact the upper surface of strip 2 over surfaces 4 and 5, and blades 62 slide axially in relation to one another so as to trace the exact transverse profile of strips 2 and 3 on line 6.

At this time, actuator 34 is activated so as to bring roller 51 into contact with the upper surface of pack 61 and exert thereon a predetermined pressure controlled by both actuators 34 and 45, with screw 15 being activated so as to reciprocate carriage 25 along blade 29. During this displacement, roller 51 operates selectively on successive blades 62, by subjecting each blade to axial pressure for pressing together surfaces 4 and 5 on splicing line 6.

During each pass of roller 51 over the upper surface of pack 61, each point along splicing line 6 is therefore subjected to localized compression, which is enhanced by the serrated design of respective edges 67 of blades 62, the effect of which is to merge the elastomeric material of strips 2 and 3, not only perpendicularly in relation to surface 1, but also transversely, thus providing for an optimum mechanical gripping and interlocking of surfaces 4 and 5 of strips 2 and 3.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a results, the embodiments described herein are subject to various modifications, changes and the like without departing from the spirit and scope of the invention with the latter being determined solely by reference to the claims appended hereto.

What is claimed is:

1. An automatic device for splicing uncured elastomeric sheet material along a predetermined transverse splicing line, said device being designed to cooperate with a surface supporting said material, said device comprising a number of blades arranged substantially perpendicular to, and facing said supporting surface and said splicing line, said blades being grouped together, in an axially-sliding manner to and from said supporting surface, into a displaceable pack extending along said splicing line and having a first lateral surface facing said supporting surface; approach means for enabling relative displacement of said pack and said supporting surface to and from an operative position wherein the material for splicing is retained between said pack and said supporting surface; and pressure means cooperating, in use, with a second surface of said pack, opposite said first surface, for axially thrusting said blades towards said supporting surface by successively applying a predetermined axial pressure on said blades.

2. A device as claimed in claim 1, characterized by the fact that said pressure means includes a splicing roller arranged facing said second surface; guide means extending in parallel with said splicing line; slide means supporting said splicing roller and adapted to travel along said guide means; first actuating means located between said slide means and said splicing roller for moving said splicing roller to and from an operative position wherein it contacts, with predetermined pressure, said second surface of said pack; and second actuating means for moving said slide means in a reciprocating manner along said guide means, so as to cause said splicing roller, when in said operative position, to successively displace said blades toward said supporting surface.

3. A device as claimed in claim 2, characterized by the fact that said approach means includes a frame supporting said pack of blades; and further actuating means for moving said frame to and from an operative position contacting said supporting surface; said blades being confined by said frame in a manner so as to slide axially in relation to same.

4. A device as claimed in claim 3, characterized by the fact that one of each pair of adjacent blades is formed from material having a low coefficient of friction.

5. A device as claimed in claims 3 or 4, characterized by the fact that said frame includes two rods parallel with each other and with said splicing line, said rods defining a slot across which said blades, in said pack extend in an axially-sliding manner; each blade presenting an intermediate portion of at most the same width as said slot, and having upper lateral wings for its own support on said rods; the length of said intermediate portion being greater than the thickness of said rods.

6. A device as claimed in claim 5, characterized by the fact that each blade presents a serrated bottom edge designed to contact said material being spliced.

7. A device as claimed in claim 5, characterized by the fact that said pressure means further includes a rocker arm hinged to a pivot member perpendicular to said splicing line and parallel with said supporting surface, said pivot member being adapted to move, by virtue of said first actuating means, to and from said supporting surface; said roller being supported in a rotary manner by a first arm on said rocker arm; and third actuating means connected to a second arm on said rocker arm, for controlling the rotation thereof about said pivot member.

* * * * *